Sept. 11, 1928.
A. H. MITTAG
1,684,137
MEANS FOR REPRODUCING POSITION
Original Filed Nov. 30, 1925
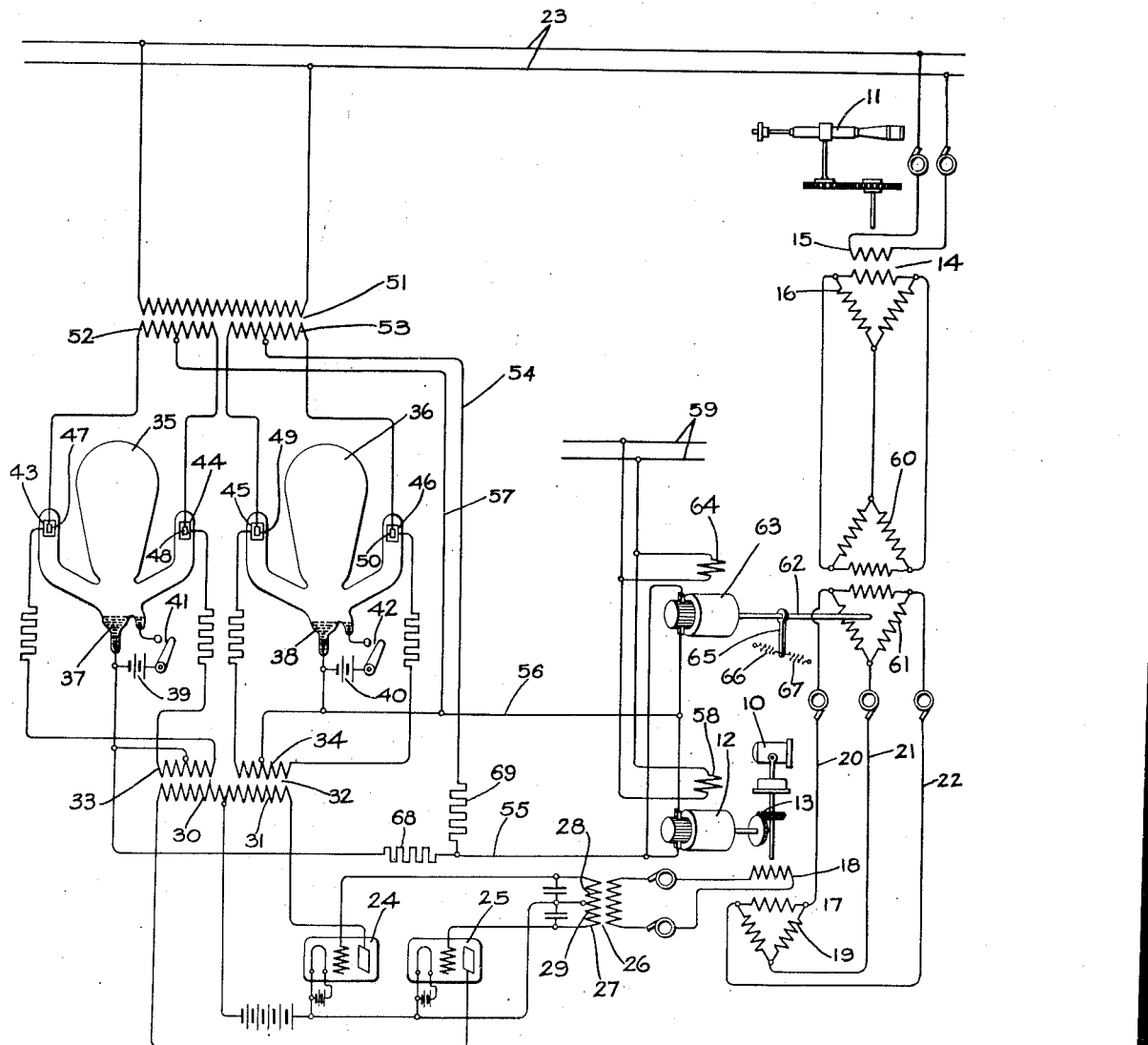
Inventor:
Albert H. Mittag,
by *[signature]*
His Attorney.

Patented Sept. 11, 1928.

1,684,137

UNITED STATES PATENT OFFICE.

ALBERT H. MITTAG, OF SCHENECTADY, NEW YORK, ASSIGNOR TO GENERAL ELECTRIC COMPANY, A CORPORATION OF NEW YORK.

MEANS FOR REPRODUCING POSITION.

Application filed November 30, 1925, Serial No. 72,177. Renewed January 26, 1928.

My invention relates to means for reproducing position and has for its object the provision of means for controlling a driving motor in response to the movements of a controlling object.

More specifically my invention relates to systems for reproducing position in which the motion of the controlling object is utilized through suitable mechanism to control a motor so as to cause the motor to drive a second or controlled object into positional agreement with the first. Such a system is described and claimed, for example, in Patent No. 1,547,392 to Hewlett and Willard dated July 28, 1925. In the arrangement shown in this patent the controlling object is arranged to produce an electromotive force which varies in value and direction in accordance with the amount and direction of the movement applied to the controlling object. This electromotive force is utilized for the control of suitable power amplifying means which in turn supplies power to the driving motor.

In one of its aspects my invention has for its object the provision of improved power amplifying means for supplying the electrical power to the driving motor and to this end I provide amplifying devices of the vapor electric type. In another of its aspects my invention relates to the provision of improved means whereby the final position of the controlled object is anticipated by the control mechanism in such manner that the driven object is brought to rest without overrunning in angular correspondence with the controlling object, and to this end I provide means responsive to the operation of the driving motor for varying the controlling electromotive force independently of the controlling object in such manner that the deceleration of the driving motor begins at such time before the driven object comes into angular agreement that overrunning is prevented. My invention is an improvement of the invention described and claimed in a copending application of Edward M. Hewlett and Waldo W. Willard, Serial No. 72,201, filed November 30, 1925, assigned to the same assignee as this invention.

For a more complete understanding of my invention reference should be had to the accompanying drawing, the single figure of which shows in diagrammatic form a system for reproducing position embodying my invention.

Referring to the drawing, I have shown my invention in one form as applied to the control of a searchlight 10, constituting a driven object, in accordance with the movements of a remotely located telescope 11, constituting a controlling object, the searchlight being controlled in such manner that it is caused to follow the movements of the telescope and thereby be directed on the same object as the telescope. As shown, the searchlight is driven in train, i. e. in a plane which is normally horizontal, so as to follow the train movements of the telescope in a plane which is the same or parallel to the train plane of the searchlight. The searchlight is operated by suitable driving means, such as a direct current electric motor 12, which is connected through gearing 13 to drive the searchlight in train, the gearing 13 having a suitable operating ratio, preferably such that the motor rotates at many times the speed of the searchlight. The circuit of the electric motor 12 is controlled in accordance with the movements of the telescope 11 so as to cause the motor to drive the searchlight.

Operatively connected to the telescope 11 is an inductive device 14 comprising in the form shown a field winding 15, which is rotatably mounted and driven by the telescope in train, and a stationary polycircuit armature winding 16, which may be physically similar to a 3-phase, bi-polar, distributed armature winding. A second inductive device 17 is provided, this device having a rotatably mounted field winding 18 and a polycircuit armature winding 19, these windings being similar respectively to the windings 15 and 61 of the device 14. Similar points of the windings 16 and 19 are electrically connected together by means of conductors 20, 21 and 22. The field winding 18 is rotated with the searchlight by the electric motor 12 and is directly connected to the searchlight so as to be operated in a 1:1 ratio therewith. The field winding 15 is operated in a 1:1 speed ratio with the telescope. The field winding 15 is connected to a suitable source of alternating current 23.

The inductive devices 14 and 17 are of a type sometimes used for transmitting angular motion. In the present system, however, the inductive devices are used for producing an alternating electromotive force which has a value dependent on the angular disagreement of the telescope and searchlight, and which has a direction or polarity with respect to the alternating current supply source 23 which is determined by the direction of the disagreement. The field windings 15 and 18 are operatively connected to the telescope and searchlight respectively in such manner that when the searchlight is in angular agreement with the telescope, as shown in the drawing, the winding 18 is in a position with relation to the armature winding 19 which is at right angles to the position of the field winding 15 with respect to its armature winding 16. In other words, the field winding 15 induces electromotive forces in the circuits of the armature winding 16, which electromotive forces are impressed on the armature winding 19 and a magnetic field thereby produced by the armature winding 19 which has an angular position in space and a direction corresponding to the angular position and direction of the field produced by the winding 15. When the telescope and searchlight are in angular agreement, the winding 18 stands at right angles to this field so that its turns are not interlinked by the field, and therefore, no electromotive force is induced in it. When the telescope is rotated, the field of winding 15 is rotated and the field produced by the armature winding 19 is rotated a like amount so that it interlinks the turns of the winding 18 and consequently induces an electromotive force in the winding 18. This electromotive force is proportional to the amount of movement given the telescope with relation to the searchlight, and it will be observed has a direction with respect to the supply source 23, which is dependent upon the direction of movement applied to the telescope. The electromotive force induced in the winding 18 is used to control the driving motor 12.

Suitable power amplifying devices are provided for supplying power to the driving motor 12, these amplifying devices being controlled by the electromotive force induced in the winding 18. As shown, the field winding 18 is connected to the input or grid circuits of two electron discharge devices or tubes 24 and 25 of a suitable well known type, shown as being of a three-electrode type. This connection is preferably effected through a transformer 26, the secondary 27 of which is provided with a central tap so that one-half 28 of the secondary is connected in the input or grid circuit of the tube 24, while the other half 29 is connected in the input circuit of the tube 25. The two tubes 24 and 25 are thus connected in a push-pull or two-way circuit so as to reproduce both halves of the electromotive force wave induced in winding 18. The output or plate circuits of the tubes are connected to the two halves 30 and 31 of the primary of a transformer 32 having two secondary windings 33 and 34.

This amplified output of the tubes 24 and 25 is impressed by means of the transformer 32 on the input circuits of two vapor electric amplying devices 35 and 36 of the type known as "thyratrons". The vapor electric devices have sufficient current carrying capacity to take care of the total current required for the motor. The two devices are similar in construction and each is provided with two grids and two anodes so that each device has two input and output circuits and may be used as a two-way rectifier. They have single cathodes 37 and 38 respectively, each of which consists of a small quantity of mercury. A small pool of mercury is provided near each cathode and exciting batteries 39 and 40 are provided whereby by closing the switches 41 and 42 in circuit therewith and tilting the devices the cathodes may be excited to start the devices in a well known manner. Preferably the switches 41 and 42 remain closed during the operation of the devices. When a voltage which is positive with respect to the cathode voltage is applied to one of the anodes of a device of this character, an arc is formed between this anode and the cathode, but when this anode becomes negative with respect to the cathode the arc is extinguished so that the device ceases to function through this particular one of its output circuits. The function of the grids is to control the formation of the arcs. When the potentials of the grids are lower than a predetermined value the arcs cannot start, but when the grid potentials are above this value the arcs can start. The characteristics of the devices may be such that certain negative grid potentials i. e. negative with respect to the cathode potentials, will prevent operation while certain positive grid potentials will produce operation.

As shown in the drawing, the secondary winding 33 is connected in the input circuits of the device 35, the central point of the secondary being connected directly to the cathode 37, while the two terminals of the secondary are connected respectively to the grids 43 and 44. In a similar manner the secondary winding 34 is connected in the input circuits of the device 36, a central point of the secondary being connected to the cathode 38, while its terminals are connected to the grids 45 and 46. It will be observed that the connections for the secondary 33 are reversed with respect to the connections for the secondary 34, which is for the purpose of giving the grids 43 and 44 suitable polarity. The output circuits of the devices 35 and 36 are energized from the alternating current supply source 23 through a transformer 51. This transformer has two secondaries 52 and 53, the terminals of the secondary 52 being connected to the anodes 47 and 48 of the device 35, and the terminals of the secondary 53 being connected to the anodes 49 and 50 of the device 36. A central tap of the secondary 53 is connected through the conductors 54 and 55, the armature of the motor 12, and conductor 56 to the cathode 38, and a central tap of the secondary 52 is connected through conductors 57 and 56, the armature of the motor 12, and conductor 55 to the cathode 37. The field 58 of the driving motor 12 is connected to a suitable direct current supply source 59.

With this connection of the secondaries, it will be observed that the two halves of each secondary are connected in the two output circuits of the particular device to which it is connected. Since the input and output voltages for the devices 35 and 36 are both ultimately derived from the alternating current supply source 23, it will be observed that the grids and plates will have maximum positive or negative voltages at substantially the same time. The input voltages may be shifted 180° in phase, however, by the winding 18, this depending upon the direction of the angular lag of the winding 18, and the connections are such that the device 35 will operate when the winding 18 lags in one direction, while the device 36 will operate to supply current to the motors in the opposite direction when the winding 18 lags in the opposite direction. In order to effect this the electrical connections for the input and output circuits of the devices 35 and 36 are such that for angular lag of the winding 18 in one direction the grid 43 is positive at the same time that its anode 47 is positive, the grid 44 and its anode 48 then being both negative. During the next half cycle of the alternating voltage impressed on the input and output circuits, the grid 43 and anode 47 will both be negative and the grid 44 and anode 48 will both be positive. For this direction of lag of the field winding 18, therefore, the device 35 will operate through first one and then the other of its output circuits to supply pulsating direct current to the driving motor 12. Under these conditions the device 36 will be inoperative, since the polarity of its grids will at all times be opposite to the polarity of its anodes. When the field winding 18 lags in the opposite direction the polarity of the transformer 32 will be reversed and consequently reversed voltages will be applied to the grids of the devices 35 and 36 whereby the device 36 will be in operation while the device 35 will not operate. The device 36 supplies a pulsating direct current to the driving motor 12 in the opposite direction from device 35 whereby the driving motor is operated in the opposite direction.

In the operation of the system thus far described, when the telescope 11 is rotated a voltage is induced in the winding 18 which causes one or the other of the devices 35 or 36 to operate and supply current to the motor 12 in such direction that the motor is caused to drive the searchlight 10 in the same direction as the telescope is being moved. At the same time, the motor turns the winding 18 in a direction such that its voltage tends to be decreased, i. e. it is moved to follow the rotation of the field set up by the armature winding 19. When the telescope is brought to rest, the motor operates to drive the searchlight until it is moved into a position of correspondence, in which position the electromotive force induced in the winding 18 will be zero and no current will be supplied to the motor and the motor will, therefore, come to rest.

Unless some means is provided for preventing it, the searchlight will tend to overrun its position of angular correspondence by reason of its own inertia and the inertia of the motor and other rotating parts, in which case the motor will be reversed and may overrun in the opposite direction and thus oscillate back and forth. Under these conditions an appreciable interval may elapse before the searchlight is brought to rest. In carrying out my invention I provide means for anticipating the final position of the searchlight so as to prevent this overrunning. This means comprises two inductively associated windings 60 and 61 which are preferably physically similar to the armature windings 16 and 19. These two windings are introduced in the connections between the windings 16 and 19, the winding 60 being connected to the winding 16, and the winding 61 being connected to the winding 19. The winding 61 is rotatable, it being mounted on a shaft 62 which may be turned through a small angle by means of a suitable electric motor 63 having its armature connected across the armature of the motor 12, and its field winding 64 connected to supply source 59. Suitable means is provided for bringing the winding 61 back toward a position of zero displacement with respect to the winding 60, this means being shown as an arm 65 on the shaft 62 which is biased to a predetermined central position by means of springs 66 and 67.

When the windings 60 and 61 are not angularly displaced, the electromotive forces induced in the winding 16 are transmitted without alteration to the winding 19. This position of the winding 61 may be and preferably is the position to which it is returned by one or the other of the springs 66 and 67. Any angular rotation of the winding 61 however, causes variations in the voltages impressed on the winding 19, these variations being dependent upon the direction of rotation of the winding 61 and, furthermore, being substantially the same as the variations which would be produced by a rotation of the field winding 15 in a suitable direction. By rotating the winding 61, therefore, the field produced by the winding 19 can be displaced independently of the telescope.

The motor 63, since it is connected across the terminals of the motor 12, has the same variations in electromotive force impressed upon it as the motor 12 and consequently in starting its torque will increase with that of the motor 12, and produce a corresponding rotation of the winding 61. The winding 61 is turned by the motor 63 in such a direction that it tends to rotate the field of the winding 19 in a direction opposite to its rotation by the telescope. This has the effect of increasing the angular lag of the searchlight which is required to produce the necessary electrical energy for the motor. Preferably the motor will be designed to drive the searchlight at the same speed as the telescope is being moved under ordinary conditions, but with a small lag as previously noted.

Assuming now that the telescope is brought to rest, this will bring the field of the winding 19 to rest, and the winding 18 will begin to overtake the field of the winding 19 and may and probably will move past this field, in which case voltage will be applied to the motor in the opposite direction whereby it will be rapidly decelerated. At the same time, however, the winding 61 will be moved back toward its original angular relation with the winding 60 by one or the other of the springs 66 or 67 due to the fact that the voltage on the motor 63 has decreased. This return movement of the winding 61 tends to increase the voltage of the winding 18. It will be observed that the field of the winding 19 is displaced initially upon starting of the motor in a direction to meet the field winding 18 so that when rotation of the field of winding 19 ceases the field winding 18 approaches a position of apparent correspondence with the field of winding 19 before the searchlight has reached a position of angular correspondence with the telescope. The result is that the final position of the searchlight is anticipated so that deceleration of the motor 12 is begun earlier than would otherwise be the case and this deceleration is begun a sufficient distance before the true position of correspondence of the searchlight is reached to allow the motor to bring the searchlight to rest in angular correspondence with the telescope without overrunning.

Preferably resistances 68 and 69 are provided in the output circuits of the devices 35 and 36 respectively. One of the purposes of these resistances is to prevent a short-circuit of the devices in the event that both devices should operate at one time in which case the resistances will be connected in series in the output circuits of the two devices. Another object of the resistances is to prevent the full voltage of the devices being applied to the motor. The resistances may be arranged, for example, to each have the same resistance as the motor.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:—

1. Means for driving an object in accordance with the movements of a controlling object, comprising a driving motor for said driven object, means comprising a vapor electric device for supplying current to said motor, and means responsive to the movements of said controlling object for controlling said vapor electric device so as to cause said motor to drive said driven object into positional agreement with said controlling object.

2. Means for driving an object in accordance with the movements of a controlling object, comprising a driving motor for said driven object, means comprising two vapor electric devices for supplying current to said motor for two directions of movement respectively, and means responsive to the movements of said controlling object for controlling said vapor electric devices so as to cause said motor to drive said driven object into positional agreement with said controlling object.

3. Means for driving an object in accordance with the movements of a controlling object, comprising means responsive to the movements of said controlling object for producing an electromotive force varying in accordance with the movements of said controlling object, a driving motor for said driven object, and two vapor electric devices controlled by said electromotive force to supply current to said motor for two directions of movement respectively so as to cause said motor to drive said driven object into positional agreement with said controlling object.

4. Means for driving an object into positional agreement with a controlling object comprising an inductive device, means operated by said controlling object for producing an electromotive force in said inductive device varying in accordance with the angular movement of said driven object, a driving motor for said driven object, means controlled by said electromotive force for controlling said motor so as to cause said motor to drive said driven object into positional agreement with said controlling object, and means for varying said electromotive force to prevent overrunning of said driven object.

5. Means for driving an object into positional agreement with a controlling object comprising an inductive device, means operated by said controlling object for producing an electromotive force in said inductive device varying in accordance with the angular movement of said driven object, a driving motor for said driven object, means controlled by said electromotive force for controlling said motor so as to cause said motor to drive said driven object into positional agreement with said controlling object, and means electrically connected to said inductive device for varying said electromotive force to prevent overrunning of said driven object.

6. Means for driving an object into positional agreement with a controlling object, comprising an inductive device driven by said controlling object, a second inductive device, electrical connections between said devices, said first inductive device being arranged to produce an electromotive force in said second inductive device varying in value and direction in accordance with the amount and direction of said angular movement, a driving motor for said driven object, means controlled by said electromotive force for controlling said motor so as to cause said motor to drive said driven object into positional agreement with the controlling object, and an inductive device interposed in said electrical connections for varying said electromotive force to prevent overrunning of said driven object.

7. Means for driving an object into positional agreement with a controlling object comprising an inductive device driven by said controlling object, a second inductive device operatively connected to said driven object, electrical connections between said devices, said first inductive device being arranged to produce an electromotive force in said second inductive device varying in value and direction in accordance with the amount and direction of said angular movement, a driving motor for said driven object, means controlled by said electromotive force for controlling said motor so as to cause said motor to drive the driven object into positional agreement with the controlling object, inductive means for varying said electromotive force independently of said inductive devices, and means for operating said inductive means upon angular disagreement of said objects so as to prevent overrunning of said driven object.

8. Means for driving an object into positional agreement with a controlling object, comprising an inductive device driven by said controlling object, a second inductive device, electrical connections between said devices, said first inductive device being arranged to produce an electromotive force in said second inductive device varying in value and direction in accordance with the amount and direction of said angular movement, a driving motor for said driven object, means controlled by said electromotive force for controlling said motor so as to cause said motor to drive said driven object into positional agreement with the controlling object, inductively cooperating windings interposed in the electrical connections between said devices, and means for rotating one of said windings with relation to the other to vary said electromotive force so as to prevent overrunning of said driven object.

9. Means for driving a driven object into positional agreement with a controlling object, comprising an inductive device connected to said controlling object having a polycircuit armature winding and a cooperating field winding, a source of alternating current supply for said field winding, an inductive device having similar windings operatively connected to said driven object, electrical connections between the armature windings of said devices whereby an electromagnetic field is produced by the armature winding of said second device having a definite angular relation to the angular position of said controlling object and inducing an electromotive force in the field winding of said second device corresponding in value and direction to the amount and direction of the angular disagreement between said objects, a driving motor for said driven object, means controlled by said electromotive force for controlling said motor so as to cause said motor to drive said driven object into positional agreement with said controlling object, inductively cooperating windings interposed in the electrical connections between said devices, and means responsive to the energization of said motor for rotating one of said windings with relation to the other to vary said electromotive force so as to prevent overrunning of said driven object.

In witness whereof I have hereunto set my hand this 28th day of November, 1925.

ALBERT H. MITTAG.